(12) United States Patent
Wellisch

(10) Patent No.: US 6,724,119 B1
(45) Date of Patent: Apr. 20, 2004

(54) SHEET-LAYERED LAMINATION STACK SLOTTED ROTOR FOR ELECTRIC MOTOR

(75) Inventor: Ernst Wellisch, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/720,520
(22) PCT Filed: Jun. 16, 1999
(86) PCT No.: PCT/DE99/01772
§ 371 (c)(1), (2), (4) Date: Dec. 22, 2000
(87) PCT Pub. No.: WO00/01052
PCT Pub. Date: Jan. 6, 2000

(30) Foreign Application Priority Data

Jun. 29, 1998 (DE) .......................... 198 29 053

(51) Int. Cl.⁷ .............................. H02K 1/00; H02K 1/06
(52) U.S. Cl. ........................................ 310/216; 310/217
(58) Field of Search ................................. 310/216–217

(56) References Cited

U.S. PATENT DOCUMENTS

| | | | | |
|---|---|---|---|---|
| 3,590,208 A | * | 6/1971 | Martini et al. ................ 219/92 |
| 3,662,200 A | * | 5/1972 | Rank et al. .................. 310/211 |
| 3,694,906 A | * | 10/1972 | Rank et al. .................... 29/598 |
| 4,472,651 A | * | 9/1984 | Jones ..................... 310/156.78 |
| 4,486,679 A | * | 12/1984 | Jones ..................... 310/156.53 |
| 4,525,925 A | * | 7/1985 | Jones ........................... 29/598 |
| 4,745,314 A | * | 5/1988 | Nakano ................ 174/DIG. 19 |
| 4,827,172 A | * | 5/1989 | Kobayashi ........... 174/DIG. 21 |
| 4,885,495 A | * | 12/1989 | Sisk ............................. 310/201 |
| 5,296,773 A | | 3/1994 | El-Antably et al. ......... 310/261 |
| 5,473,213 A | * | 12/1995 | Kahle, Sr. .................... 310/270 |
| 5,952,757 A | * | 9/1999 | Boyd, Jr. ................ 310/156.81 |
| 6,002,191 A | * | 12/1999 | Saban .......................... 29/598 |
| 6,018,207 A | * | 1/2000 | Saban et al. ................... 29/738 |
| 6,031,312 A | * | 2/2000 | Zoche et al. ................... 29/598 |
| 6,072,259 A | * | 6/2000 | Kawabata et al. ........... 310/216 |
| 6,177,750 B1 | * | 1/2001 | Tompkin ..................... 310/211 |
| 6,345,433 B1 | * | 2/2002 | Kliman et al. ............... 310/217 |

FOREIGN PATENT DOCUMENTS

| | | |
|---|---|---|
| DE | 1 107 804 | 5/1961 |
| EP | 0 641 059 A | 3/1995 |
| JP | 02 036741 A | 2/1990 |
| JP | 06 145917 A | 5/1994 |
| JP | 62 256917 A | 11/1997 |

* cited by examiner

*Primary Examiner*—Thomas M. Dougherty
*Assistant Examiner*—Pedro J. Cuevas
(74) *Attorney, Agent, or Firm*—Henry M. Feiereisen

(57) ABSTRACT

In an electric motor with a stator and a rotor which includes at least a stack of laminations (2) layered by sheets and provided with slots (8) for receiving rotor windings, at the end face (3, 4) of at least one stack of laminations (2) at least one rotor end sheet (5) is provided which is made of high-strength fine-grain structural steel and exhibits, at least in proximity of the rotor axis, the geometric shape of the sheets layered in the stack of laminations (2). With such a rotor, high speeds and a high operational safety can be ensured.

11 Claims, 3 Drawing Sheets

SHEET-LAYERED LAMINATION STACK SLOTTED ROTOR FOR ELECTRIC MOTOR

BACKGROUND OF THE INVENTION

The invention relates to an electric motor including a stator and a rotor which includes at least a stack of laminations layered by sheets and provided with slots for receiving rotor windings.

German Pat. No. DE 1 107 804 discloses an electric machine in which the dampening cage of the armature includes poles or pole shoes and is made through dead-mold casting, permanent mold casting or die casting. The short-circuit rings are configured as prolonged pole tips which support the winding, disposed on the pole shank, on the end faces of the pole iron as protection against a deformation or destruction through centrifugal forces, and extend into the space between two neighboring pole windings. Hereby, the high centrifugal forces of the armature are only partly absorbed.

Moreover, it is known, to fabricate the stack of laminations of the armature with end sheets of structural steel or compression rings. The end sheets are configured in the slot area as pressure fingers to effect an axial support. There is no radial force-fitting engagement between end sheet and the short circuit bars in the slot area. The support effect at the bar end must be assumed by the electric sheet. The slots of the electric sheet for receiving the rotor bars are provided with a leakage orifice which is open toward the outer diameter of the sheet. During operation, the rotor bars are pushed by the centrifugal forces to the outside and supported in the area of the leakage orifice at the rod end of the stack of laminations. At this location, the yield point and the strength of the electric sheet restrict a higher operational speed.

SUMMARY OF THE INVENTION

It is therefore an object of the invention to provide an electric motor having a rotor configured for high speeds while ensuring a high operational safety.

The posed object is attained by providing at the end face of at least one stack of laminations at least one rotor end sheet which is made of high-strength fine-grain structural steel and exhibits, at least in proximity of the rotor axis, the geometric shape of the sheets layered in the stack of laminations.

These rotor end sheets of high-strength fine-grain structural steel may be made through laser cutting, water-jet cutting or other suitable cutting processes and exhibit a high yield point and strength (770 to 980 $Nm/mm^2$). Thus, material stress during operation at high speeds can be durably coped with. The fatigue strength of these materials ranges for the stated strength zone at 310 to 400 $Nm/mm^2$.

The rotor end sheets are shrunk or pressed onto the finished or unfinished rotor shaft.

In accordance with a further embodiment, the leakage orifices of the rotor end sheets are closed so as to realize a further compaction and thus an increase in the yield point of the electric sheets. Radial forces, applied in particular by the winding head at high speeds can be better absorbed in this manner. In addition, the winding or the winding heads are supported hereby at less stress to the material in the area of the electric sheets. As a consequence of arranging at least some leakage orifices in the rotor end sheet, the electromagnetic properties can be enhanced. By a preferred enlargement of the cross section in the area that is subject to high strain, material stress can be further reduced.

Apart from the rotor end sheets of the individual stacks of laminations, also electric sheets or partial stacks of laminations, positioned axially further inwardly, form a closed leakage orifice and thereby contribute to a further support of the winding and the winding heads, without adversely affecting the electromagnetic properties of the armature.

BRIEF DESCRIPTION OF THE DRAWING

The invention as well as further advantageous configurations of the invention according to the features set forth in the subclaims will now be described in more detail with reference to exemplified embodiments illustrated schematically in the drawing, in which:

DETAILED DESCRIPTION OF PREFERRED EMBODIMENTS

Figure 1:
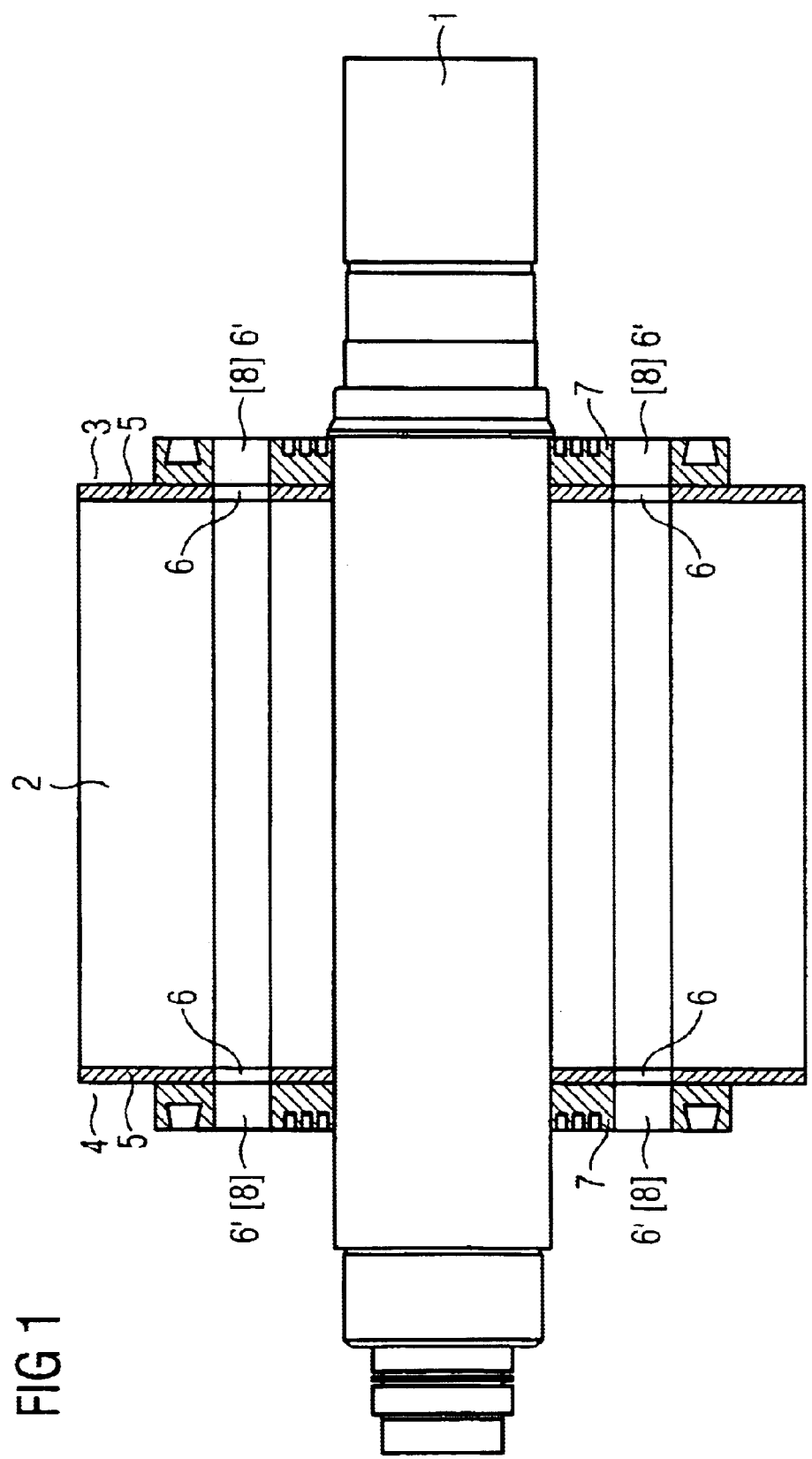
FIG. 1 shows an axial section of a rotor of this type.

FIG. 1 shows a rotor shaft 1 on which a stack of laminations 2 is shrunk or pressed and has on its respective end faces 3, 4 rotor end sheets 5. The rotor end sheets 5 have axial openings 6. These openings 6 correspond to the openings of the stack of laminations 2. These openings 6 serve substantially to provide an axis-parallel supply of cooling air. Diecast rings 7 are positioned at the respective end faces 3, 4 of the rotor end sheets 5 for axial securement of the stack of laminations 2, and are also provided with openings 6' for passage of the stream of cooling air, with the openings 6' of the diecast rings 7 extending in alignment with the openings 6 of the rotor end sheets 5.

Figure 2:
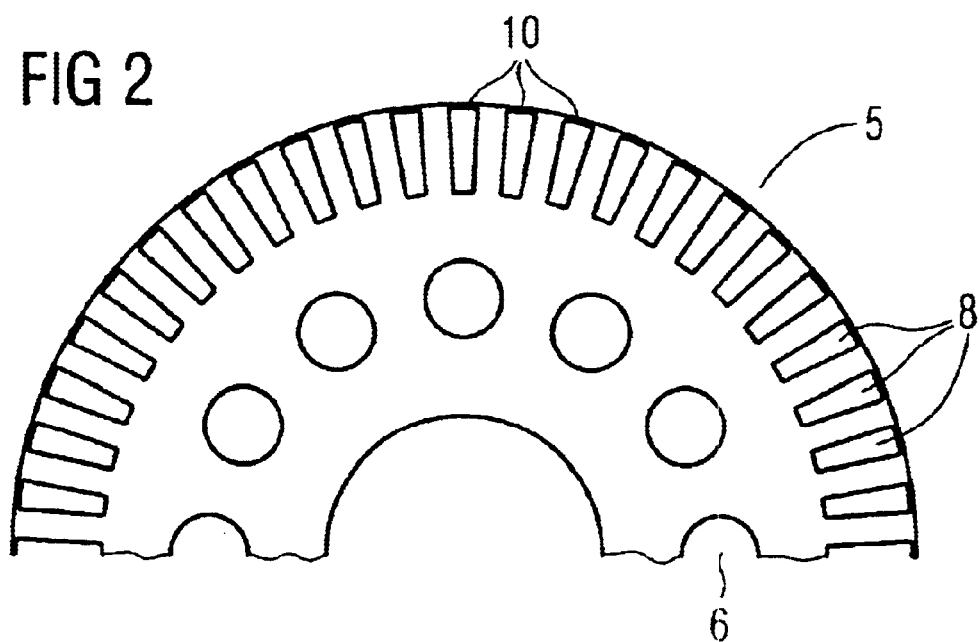
FIG. 2 shows a cross section of a rotor end sheet.
Figure 3:
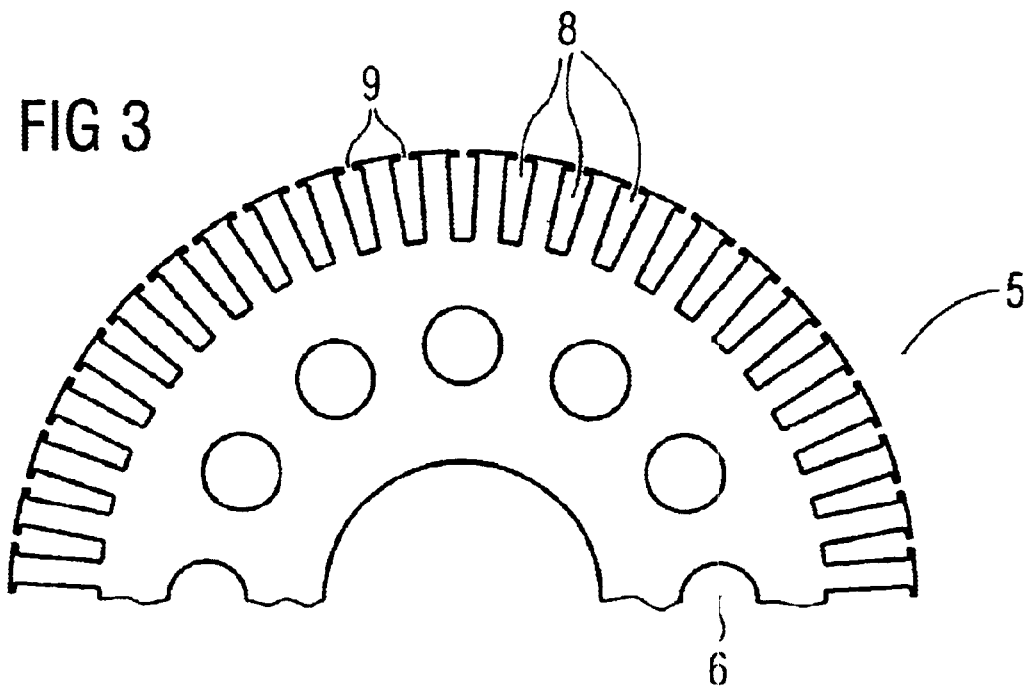
FIG. 3 is a cross section of a further rotor end sheet.

FIGS. 2, 3 show a cross section of half of such a rotor end sheet 5, including the openings 6 for the cooling air stream and slots 8 located at the outer perimeter for accommodation of the rotor windings or bars, not shown in more detail.

Figure 4:
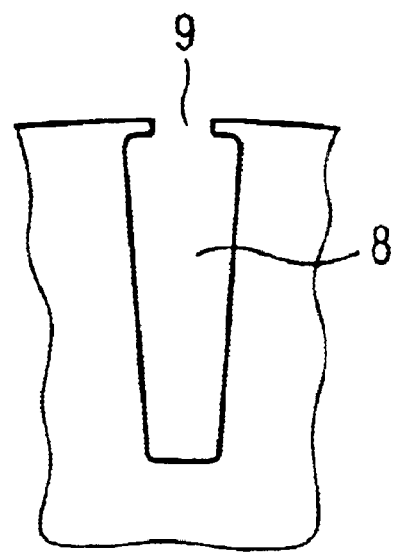
FIG. 4 is a cutaway view of a rotor end sheet with closed leakage orifice.
Figure 5:
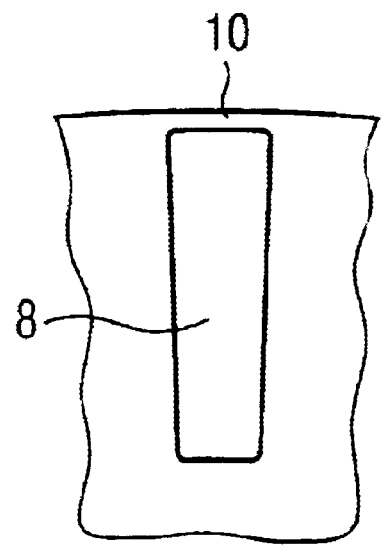
FIG. 5 is a cutaway view of a rotor end sheet with open leakage orifice.

According to FIGS. 4, 5, the slots 8 have hereby an open leakage orifice 9 or a closed leakage orifice 10. The closed leakage orifices 10 have the advantage of contributing to a further increase of the yield point at high speeds of the motor. In contrast thereto, the open leakage orifices 9 have better electromagnetic properties.

At operation of an electric motor, not shown in more detail, the centrifugal forces act primarily upon the rotor end sheets 5 which are made of high-strength fine-grain structural steel, so that the slots 8 of the stack of laminations 2 are relieved. The winding heads as well as the windings themselves are supported essentially by the rotor end sheets 5. Such rotor end sheets 5 are mainly produced through a cutting process, such as water-jet cutting or laser cutting. Of course, other cutting processes or punching processes are also suitable in this context.

What is claimed is:

1. Electric motor including a stator and a rotor which defines a rotor axis and includes at least a stack of laminations layered by sheets and provided with slots for receiving rotor windings, wherein at an end face of the at least one stack of laminations, there is provided at least one rotor end sheet which abuts laterally in radial direction the stack of laminations and is made of high-strength fine-grain structural steel, wherein the rotor end sheet has a flat thin configuration and matches at least in proximity of the rotor axis, a shape of the sheets layered in the stack of laminations.

2. Electric according to claim 1, wherein the rotor end sheet is provided with slots for receiving the rotor windings, said slots of the rotor end sheet being closed.

3. Electric motor according to claim 1, wherein the rotor end sheet is provided with slots for receiving the rotor windings, at least some the slots of the rotor end sheet having leakage orifices.

4. Electric motor according to claim 2 in the form of a high-speed, heavy-duty asynchronous motor.

5. Electric motor according to claim 3 in the form of a high-speed, heavy-duty asynchronous motor.

6. An electric motor, comprising:

a stator; and a rotor defined by a rotor axis and having a stack of laminations which is layered by sheets, said stack of laminations having opposite end faces, and two rotor end sheets, one of the rotor end sheets provided on one of the end faces of the stack of laminations, and the other one of rotor end sheets provided on the other one of the end faces of the stack of laminations, each of said rotor end sheets abutting laterally in radical direction the stack of laminations and being made of high-strength fine-grain structural steel, wherein each of the rotor end sheets has a flat thin configuration and matches, at least in proximity of the rotor ends, a shape of the sheets layered in the stack of laminations.

7. The electric motor of claim 6, wherein each of the rotor end sheets has slots for receiving rotor windings, said slots being closed.

8. The electric motor of claim 6, wherein each of the rotor end sheets has slots for receiving rotor windings, at least some of the slots being formed with leakage orifices.

9. The electric motor of claim 6 in the form of a high-speed, heavy-duty asynchronous motor.

10. Electric motor according to claim 1, wherein the high-strength fine-grain structural steel of the rotor end sheets is magnetic.

11. The electric motor of claim 6, wherein the high-strength fine-grain structural steel of the rotor end sheets is magnetic.

* * * * *